April 21, 1964     G. A. HOFF     3,129,648
BLAST PRESSURE CONTROL AND AIR FILTER MEANS
FOR UNDERGROUND SHELTERS Filed Nov. 10, 1961     2 Sheets-Sheet 1

INVENTOR.
Glenn A. Hoff
BY
Fred C. Matheny
ATTORNEY

April 21, 1964  G. A. HOFF  3,129,648
BLAST PRESSURE CONTROL AND AIR FILTER MEANS
FOR UNDERGROUND SHELTERS
Filed Nov. 10, 1961  2 Sheets-Sheet 2

INVENTOR.
Glenn A. Hoff
BY
Fred C. Matheny
ATTORNEY

United States Patent Office 3,129,648
Patented Apr. 21, 1964

3,129,648
BLAST PRESSURE CONTROL AND AIR FILTER
MEANS FOR UNDERGROUND SHELTERS
Glenn A. Hoff, 1019 W. 65th St., Seattle 7, Wash.
Filed Nov. 10, 1961, Ser. No. 151,477
9 Claims. (Cl. 98—119)

My invention relates to blast pressure control and air filter means for underground shelters.

A general object of my invention is to improve and increase the efficiency of devices used to safeguard the supply of air to an underground shelter.

Another object of my invention is to provide efficient and reliable apparatus of this nature which is highly resistant to blast pressure damage and which will minimize the danger of excess high and low pressure, herein referred to as over-pressure and under-pressure, resulting from blast.

Another object is to provide highly efficient air filter means for safeguarding the purity of a supply of air to an underground shelter and to protect said air filter means against blast pressure damage.

Another object is to provide apparatus of this nature which is highly resistant to excess heat which may accompany excess blast pressure.

Another object is to provide a highly efficient blast valve which will instantly check both the over-pressure produced by a blast and the under-pressure which follows the over-pressure of a blast and could, conceivably, draw a major portion of the air out of an underground shelter.

Other objects of my invention will be apparent from the following description taken in connection with the accompanying drawings.

I have herein disclosed this apparatus as used in connection with the air intake conduit of an underground shelter. However it will be understood that the blast deflector and valve means but not the air filter will also be used in connection with the air outlet or air exhaust means from the shelter.

In the drawings FIGURE 1 is a vertical sectional view of blast deflector means and combined over-pressure and under-pressure control valve means constructed in accordance with my invention.

Like reference numerals refer to like parts throughout the several views.

Figure 1:
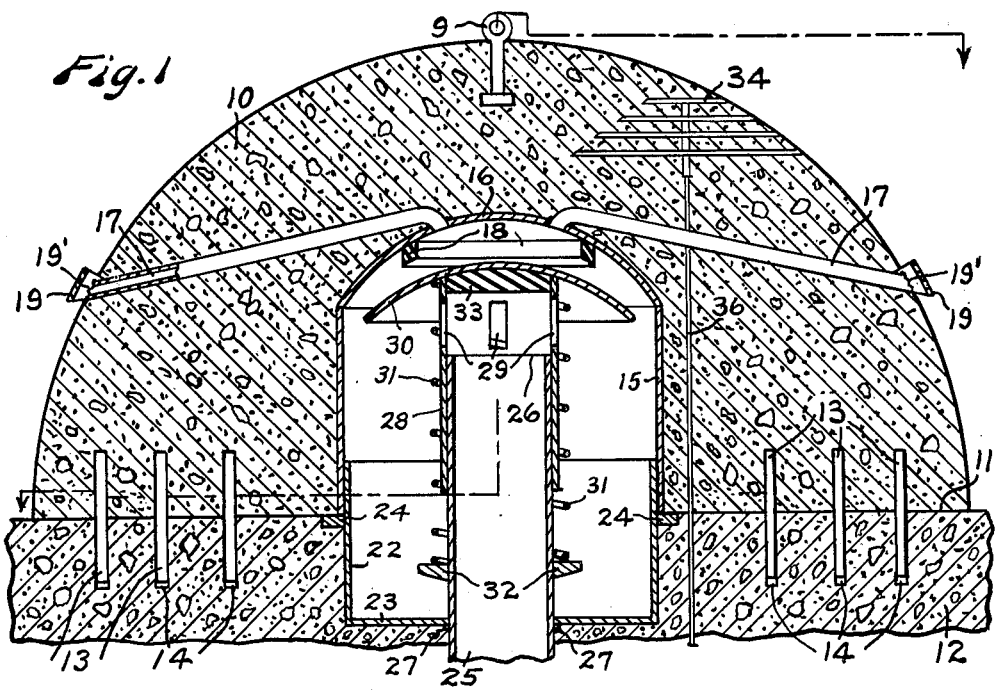

The blast deflector part of my invention comprises a reinforced concrete dome 10 of approximately semispherical shape designed to offer strong resistance to primary and secondary blast effects and adapted to be used in place of the usual easily damaged air intake and air outlet devices which form part of the air control and circulation systems of underground shelters. The dome 10 preferably has a flat bottom 11 adapted to rest on a concrete base 12. Base 12 can be embedded in the ground G, FIG. 3, and have its top surface at about ground level so as to support the base of the dome 10 at about ground level. Preferably a lift ring 9 has its shank embedded in the uppermost axial portion of the dome 10, the ring serving as a means by which the dome can be handled. Dowel means, such as pins 13 are embedded in and protrude downwardly from the base 11 of dome 10 and fit within suitable holes 14 in the concrete base 12 to resist sidewise movement of dome 10 on base 12. The dome 10 and base 12, being of concrete, are highly resistant to excessive heat. Both said dome 10 and base 12 can be reinforced as desired.

A cylindrical housing 15 of inverted cup shape, formed of fairly heavy metal and having a dome shaped upper end 16 is embedded in the dome 10. The housing 15 has a normally open bottom end which is flush with the flat bottom 11 of the dome 10. A plurality of equidistantly spaced radially positioned conduits in the form of pipes or tubes 17 are embedded in the concrete dome 10. The inner ends of these pipes or tubes 17 are welded to or otherwise rigidly connected with the central portion of the dome shaped upper end 16 of the housing 15 and said tubes 17 communicate with the interior of said housing 15. A concentric annular valve seat 18 of tough and strong but preferably resilient material is secured to the inner side of the end member 16 of housing 15. The inner ends of the tubes 17 communicate with the upper end 16 of housing 15 within the area bounded by valve ring 18. Preferably the tubes 17 are slightly inclined downwardly from their inner toward their outer ends to better exclude moisture and foreign matter and the outer ends of said tubes terminate at the outer wall of the dome 10. Preferably a screen 19' is placed over the outer end of each tube 17 to exclude insects and prevent entrance of foreign matter. Also preferably a U-shaped blast guard 19 is welded to the outer end of each tube 17 and arches over the screened end of the tube to serve as a baffle and impede the direct entrance of blast pressure and to protect the screen 19'. Preferably the concrete which forms the dome 10 is poured or cast around the housing 15 and pipes 17 so that the pipes or tubes serve as reinforcing in the concrete.

The outer ends of the tubes 17 are well protected against the direct effects of blast pressure because they are evenly distributed around the dome 10, are shielded by the U-shaped members 19 and terminate in a part of the external wall of the dome 10 which is more nearly vertical than horizontal.

A cylindrical cup shaped guide ring 22 having a bottom wall 23 is embeded in the concrete base 12 and extends upwardly therefrom for a substantial distance. The top end of the guide ring 22 is open. Preferably an external metal stop ring 24 is welded to the guide ring 22 and positioned flush with the top surface of the concrete base 12. The lower end of the housing 15 rests against the stop ring 22 when the several parts are set up as shown in FIG. 1. Also when the dome 10 is applied, as shown in FIG. 1, the lower end portion of the cylindrical housing 15 fits over the protruding upper end portion of the guide ring 22 making a close fitting telescopic connection.

Figure 3:
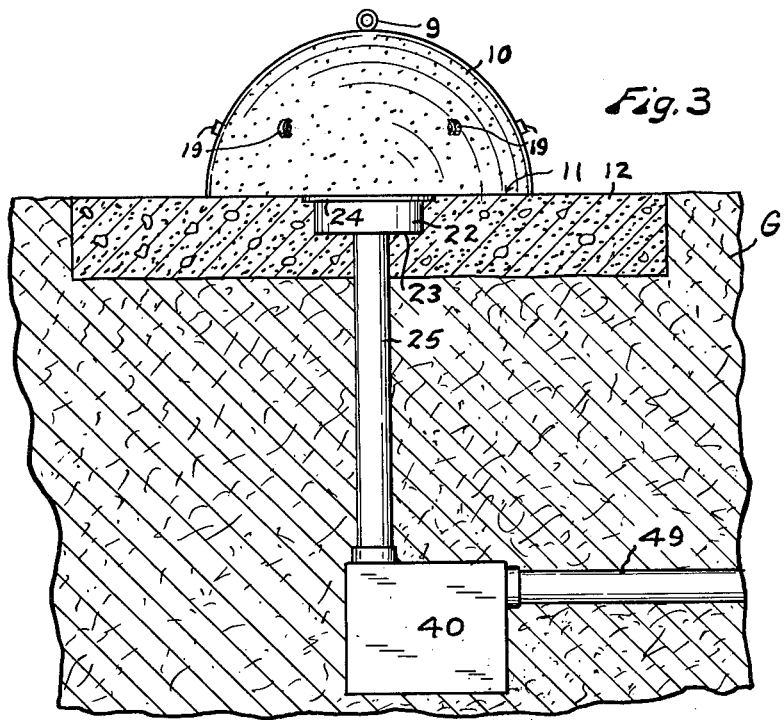
FIG. 3 is a view partly in section and partly in elevation, on a smaller scale than FIGS. 1 and 2, showing my air filter in combination with the devices illustrated in FIGS. 1 and 2.

An axially positioned underground conduit or air pipe 25 extends upwardly through the bottom 23 of the guide ring 22 and terminates in an open upper end 26 which, when the device is assembled, is positioned within the cylindrical housing 15 with said upper end 26 a substantial distance below the upper end 16 of the housing 15. Preferably the air pipe 25 is welded to the bottom 23 of guide ring 22 at location 27 where it passes through said bottom 23. The lower end of the underground air conduit 25 can be connected with an underground shelter through an air filter 40, as shown in FIG. 3 and hereinafter explained.

A tubular valve sleeve 28 fits telescopically and slidably over the upper end portion of the air pipe 25. Ports 29 are provided in the upper end portion of the sleeve 28 so that they will normally be above the upper end 26 of air conduit 25 to provide a free passage of air to or from said conduit 25. A concavo-convex mushroom shaped valve member or cap 30 of substantially larger diameter than the valve sleeve 28 is rigidly secured, preferably by welding, to the upper end of the sleeve 28 with its convex side uppermost. A spiral compression spring 31 is disposed on the pipe 25 and sleeve 28 with its upper end in engagement with the cap 30 and its lower end resting on an external spring support 32 which is rigid with the pipe 25. The spring 31 is just strong enough to support the valve sleeve 28 and valve 30 in a position in which air can pass freely through the ports 29. As long as air is moving in a normal manner in either direction through the housing 15 the sleeve 28 and valve 30 will remain in this open position. Excess downward air pressure on the upper side of the valve member 30 will move said valve member and the sleeve 28 downward on the pipe 25 and cause a valve seat gasket 33 in the upper end of the sleeve 28 to make sealing contact with the top of the conduit 25. This will check the downward flow of air through the air conduit 25. Excess upward air pressure on the cap 30, such as can occur if tubes 17 are subjected to less than atmospheric pressure, will move the valve 30 and sleeve 28 upwardly, causing the top of the valve member 30 to close against the valve seat 18 and check an upward flow of air through pipe 25.

Preferably a radio antenna 34 is embedded in the dome 10 and suitable connecting devices 36 extend from said antenna 34 to a location where they are readily accessible.

Figure 2:
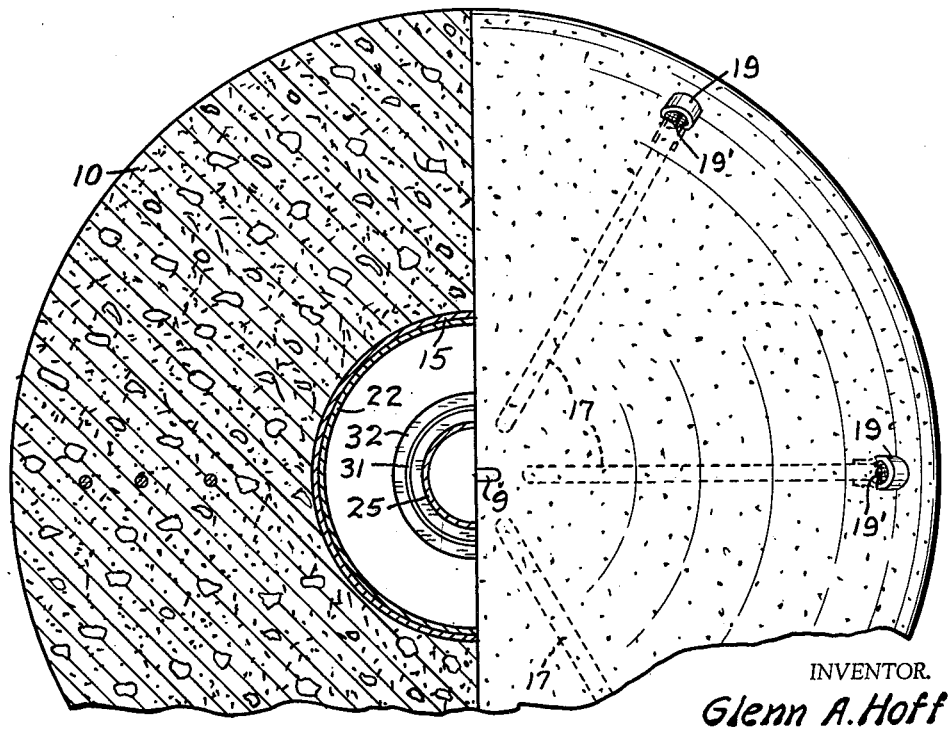
FIG. 2 is a view partly in section and partly in top plan of the same, taken substantially on broken line 2—2 of FIG. 1.

If the apparatus shown in FIGS. 1 and 2 is to be used as part of an air outlet or air exhaust means from an underground shelter then the pipe 25 can be connected directly with the shelter. If it is to be used as part of the air intake means of the shelter then the air conduit 25 is connected with an air filter of the type shown in FIGS. 3, 4 and 5 and hereinafter referred to as a filter vault. Said filter vault is designed to be buried a safe distance underground and a safe distance away from the underground shelter with which it is connected.

Said filter vault comprises a housing 40, which is constructed of fairly strong metal such as fourteen gauge mild steel, is of all welded construction and preferably coated with plastic inside and outside so that it is water tight and air tight and completely sealed against the elements. Said filter vault housing 40 is provided with a vertical partition 41 which divides the interior of said housing into two side by side compartments. One of said compartments 42 communicates with the underground air conduit 25 and functions as a primary air receiving chamber. A horizontally disposed filter 43 is supported in the other compartment in spaced relation from both the top and bottom walls of the housing 40 forming a clean air take-off chamber 44 above said filter 43 and a secondary air receiving chamber 45 below said filter. Angle bars 46, secured to the walls of the housing 40, may be used to support the filter 43 against both downward and upward movement. The upright partition 41 extends entirely across the housing 40 and a narrow air pasageway 47 is provided in said partition 41 closely adjacent to and below the bottom of the filter 43. An inclined air deflector plate 48 is rigid with the partition 41 and extends outwardly and downwardly therefrom in the compartment 42 close to and above the air passageway 47. Preferably both the air passageway 47 and the deflector plate 48 extend substantially entirely across the housing 40.

Figure 4:
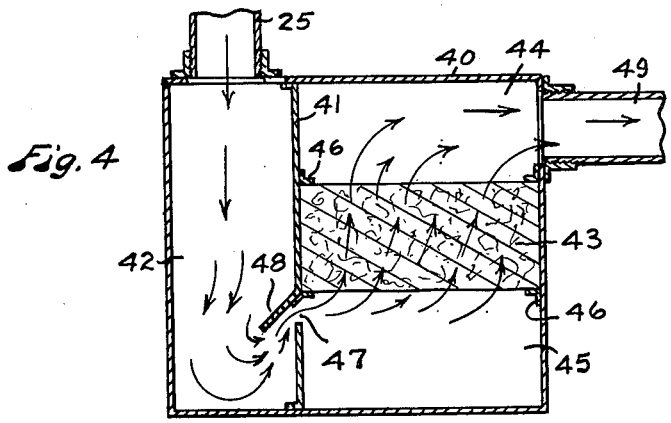
FIG. 4 is a vertical sectional view, on a larger scale than FIG. 3, showing an air filter.
Figure 5:
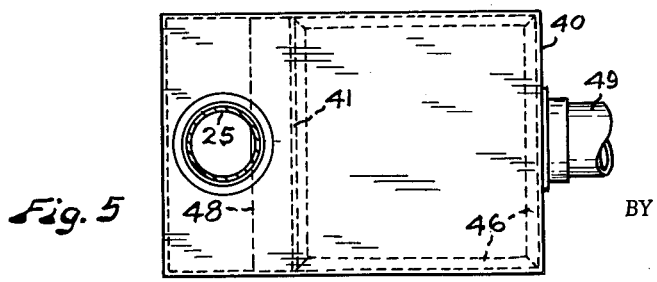
FIG. 5 is a top plan view of said air filter.

Air from underground conduit 25 entering at the top of the primary air receiving chamber 42 will move downwardly past the inclined deflector plate 48, as indicated by arrows, FIG. 4, will then reverse its direction of travel and pass through the passageway 47 into the secondary air receiving chamber 45, thence upwardly through the filter 43 into the clean air chamber 44 and out through the pipe 49 to an underground shelter. The pipe 49 thus becomes a continuation of the conduit 25. Reversal of the direction of travel of the downwardly moving air as it passes around the lower edge portion of the inclined baffle plate 48 will tend to cause this moving air to drop particles of dust and solid matter in the bottom of the chamber 42. The chamber 42 thus functions as a trap which tends to remove undesirable solid matter from the air. The chambers 42 and 45 also serve as expansion chambers, which in the event of over-pressure afford some protection to the filter 43 against blast damage.

The heavy semi-spherical shape blast dome 10 and the double acting pressure operated blast valve 30 are important parts of my invention. The blast dome 10 will withstand a heavy blast without being moved or seriously damaged. The valve 30 is normally held open by the spring 31, which is only strong enough to support the weight of the valve 30 and sleeve 28 and little more. Over-pressure entering through tubes 17 and incident on the top of the valve 30 will instantly close said valve by pressing the gasket 33 down against the top of the air conduit 25. This minimizes the danger of injury to the filter in housing 40 and the danger of injury to persons dependent on obtaining air through conduit 25.

As an aftermath of an over-pressure wave an under-pressure or partial vacuum follows. This under-pressure could conceivably draw the oxygen from the shelter and endanger the lives of persons therein. This is prevented by the mushroom shaped valve 30 being pressed or drawn upwardly and sealed against the gasket 33 in the upper end of the housing 15.

The housing 15 is substantially larger in diameter than are the valve parts 25 and 28. This provides ample room for a relatively large mushroom shaped valve 30. Also it provides, around the parts 25 and 28, a fairly large expansion chamber which will partially absorb and cushion the shock of an excess over-pressure.

The foregoing description and accompanying drawings clearly disclose a preferred embodiment of my invention but it will be understood that this disclosure is merely illustrative and that changes may be made within the scope of the following claims.

I claim:

1. In air blast control means, a substantially semi-spherical heavy concrete blast dome capable of being supported substantially at ground level with its convex side uppermost, said blast dome having in its lower central portion an air chamber adapted for communicative connection with an underground air circulation conduit; a plurality of radially disposed substantially uniformly spaced apart air tubes of small diameter embedded in said dome and extending between said air chamber and the exterior wall of said dome providing a plurality of small air intake openings distributed around said dome and terminating in generally upright portions of the external wall of said dome, said air chamber being of much smaller cross sectional area than the dome and the dome walls surrounding the air chamber being solid and massive and free from openings except for said air tubes; said air tubes being inclined downwardly in outward directions; and a U-shaped shield carried by and arched over the outer end of each air tube.

2. In air blast control means, a substantially semi-spherical heavy concrete blast dome capable of being supported substantially at ground level with its convex side uppermost, said blast dome having in its lower central portion an air chamber; a plurality of substantially uniformly spaced apart air conduits of small cross sectional area in said dome extending between said air chamber and the exterior wall of said dome providing a plurality of small air intake openings distributed around said dome, said air chamber being relatively small and the dome walls surrounding the air chamber being solid and massive and free from openings except for said small air conduits; an annular valve seat rigid with and sealed to the upper end wall of said air chamber encircling the inner ends of all of said small air conduits; an underground air circulation conduit extending upwardly into said air chamber; normally open double acting check valve devices controlling communication between said underground air conduit and said small air conduits; means positioning and guiding said check valve devices for movement between said valve seat and the upper end portion of said underground air circulation conduit; and spring means resiliently holding said check valve devices in the normally open position, said spring means providing air influenced closing movement of said check valve devices relative to said valve seat and relative to the upper end portion of said underground air circulation conduit, said check valve devices being capable of being closed by an excess flow of air in either direction therethrough.

3. In air blast control means, a substantially semi-spherical heavy concrete blast dome having a flat bottom and capable of being supported with its flat bottom substantially at ground level and with its convex side uppermost; a cylindrical metal housing of inverted cup shape embedded in the lower portion of said blast dome, said housing having an open bottom end flush with the flat bottom of said dome; a plurality of radially disposed substantially uniformly spaced apart conduits of small cross sectional area in said dome extending between the upper end portion of said cup shaped metal housing and the exterior wall of said dome providing a plurality of small air intake openings distributed around said dome, said cup shaped housing being relatively small and the dome walls surrounding said cup shaped housing being solid and massive and free from openings except for said small air conduits; an annular valve seat rigid with and sealed to the upper end wall of said cup shaped housing encircling the inner ends of all of said small air conduits; an underground air circulation conduit extending upwardly into said cup shaped housing; normally open double acting check valve devices controlling communication between said underground air conduit and said small air conduits; means positioning and guiding said check valve devices for movement between said valve seat and the upper end portion of said underground air circulation conduit; and spring means resiliently holding said double acting check valve devices in the normally open position, said spring means providing for air influenced closing movement of said check valve devices relative to said annular valve seat and relative to the upper end portion of said underground air circulation conduit; said check valve devices being capable of being closed by an unbalanced pressure tending to produce a rapid flow of air in either direction through said housing.

4. The apparatus as claimed in claim 3 in which a fixedly supported upwardly protruding guide ring having a bottom wall therein extends telescopically into and snugly fits within the lower end portion of said inverted cup shaped housing and the underground air circulation conduit with which said check valve devices cooperate extends upwardly through and is air sealed and rigidly attached to the bottom wall of said guide ring.

5. In air blast control means, a heavy concrete blast dome having a flat bottom and a convex upper portion; a cylindrical metal housing of inverted cup shape embedded in the lower portion of said blast dome, said housing having a dome shaped upper end and having an open bottom end flush with the flat bottom of said blast dome; a plurality of spaced apart air tubes radiating from the dome shaped upper end of said housing and terminating in the exterior wall of said blast dome; a flat horizontal base adapted to support said blast dome; a guide ring rigid with and extending upwardly from said base and fitting telescopically and snugly within the lower end portion of said housing; an underground air circulation conduit extending upwardly into said guide ring and said housing axially thereof and terminating in an open upper end a telescopic valve sleeve slidable over the upper end portion of said underground air conduit, said sleeve having ports adjacent its upper end; a concavo-convex valve member of substantially larger diameter then said sleeve rigid with the upper end of said sleeve; a gasket within said sleeve positioned against the under side of said valve member capable of closing movement against the upper end of said underground air conduit; a concentric valve ring carried by the upper dome shaped end of said housing and encircling the inner ends of all of said air tubes; and a relatively weak spring normally supporting said valve member and sleeve with the valve member in open position relative to the upper end of said underground air conduit and said concentric valve ring.

6. In air blast control means, a substantially semi-spherical heavy concrete blast dome having a flat bottom and capable of being supported with its flat bottom substantially horizontal and substantially at ground level and with its convex part uppermost; a cylindrical metal housing of inverted cup shape embedded in the lower portion of said blast dome and having an open bottom end flush with the bottom of said dome; a plurality of spaced apart air tubes of small cross sectional area radiating from the upper end portion of said inverted cup shaped housing and terminating in the exterior wall of said dome providing for a circulation of air between said inverted cup shaped housing and the atmosphere; a flat horizontal base adapted to support said dome; a fixed guide ring extending upwardly from said base and fitting telescopically and snugly within the lower end portion of said housing; said guide ring having a bottom wall; an underground air circulation conduit extending upwardly through said guide ring and terminating in said housing; a valve sleeve fitting telescopically and slidably over the upper end portion of said air circulation conduit, said valve sleeve having ports in its side walls adjacent its upper end; a valve member rigid with the upper end portion of said sleeve; a gasket within said sleeve above said ports capable of closing the upper end of said air circulation conduit in response to downward movement of said sleeve; a valve ring within said housing and carried by the upper end wall thereof, the inner ends of the air tubes in said dome communicating with said housing within said valve ring; and a spring normally supporting said sleeve and said valve member clear of said valve ring and with the ports in said sleeve in an open position above the top end of said air conduit, said valve adapted to close against said valve ring in response to upward air pressure and said gasket being adapted to close against the top of said underground air conduit in response to downward air pressure.

7. In means for controlling a supply of air to an underground shelter, a heavy concrete blast dome supported substantially at ground level with its convex part uppermost, said blast dome having an air chamber in its lower central portion; a plurality of angularly spaced apart air tubes of small diameter in said blast dome extending in generally radial directions between said air chamber and the exterior of said blast dome providing a plurality of small air intake openings distributed around said dome and terminating at their outer ends in generally upright portions of the external wall of said dome, said air chamber being of much smaller cross sectional area than the dome and the dome walls surrounding the air chamber being solid and massive and free from openings except for said air tubes; an underground air circulation conduit controlling a flow of air between the atmosphere and an underground shelter and having its upper end portion communicatively connected with said air chamber in said blast dome; and an air filter interposed in said underground air conduit.

8. In apparatus of the class described, an air filter comprising a rectangular housing; an upright partition dividing said housing into a primary air receiving compartment and a filter receiving compartment, said partition having a long narrow horizontal air passageway extending from side to side thereof close to but in spaced relation above the bottom of said housing; an inclined baffle plate in the primary air receiving chamber extending outwardly and downwardly from a part of the partition immediately above said air passageway; and a normally horizontal air filter extending across said filter receiving compartment immediately above the level of the top of said air passageway, said housing having air inlet means communicating with the upper portion of said primary air receiving chamber and having air take off means communicating with the space in said housing above said air filter.

9. In air control means for an underground shelter, an air filter comprising a rectangular housing; upright partition means in said housing dividing said housing into a primary air receiving compartment and a filter receiving compartment; an air filter extending across said filter receiving compartment in spaced relation from both the top wall and the bottom wall of said housing forming a secondary air receiving compartment below said filter and a clean air compartment above said filter; a downwardly directed air inlet conduit communicating with the upper portion of said primary air receiving compartment; a relatively long narrow air passageway in said upright partition, the upper edge of said air passageway being below and closely adjacent to the lower plane of said filter; an inclined baffle plate in said primary air receiving compartment extending outwardly and downwardly from said upright partition, the upper edge of said baffle plate being closely adjacent to the upper edge of said air passageway; and air outlet conduit means connected with said clean air compartment.

References Cited in the file of this patent

UNITED STATES PATENTS

| | | |
|---|---|---|
| 1,149,147 | Linn | Aug. 3, 1915 |
| 2,296,984 | Corbetta | Sept. 29, 1942 |
| 2,704,983 | Van Dronkelaar | Mar. 29, 1955 |
| 2,967,494 | Rosenfeid | Jan. 10, 1961 |

FOREIGN PATENTS

| | | |
|---|---|---|
| 875,912 | Great Britain | Aug. 23, 1961 |